(12) United States Patent
Hagino et al.

(10) Patent No.: US 8,502,481 B2
(45) Date of Patent: Aug. 6, 2013

(54) PHASE SHIFT CONTROLLER

(75) Inventors: Junichi Hagino, Kyoto (JP); Shingo Haruta, Kyoto (JP); Toshikazu Takei, Kyoto (JP)

(73) Assignee: Rohm Co., Ltd. (JP)

( * ) Notice: Subject to any disclaimer, the term of this patent is extended or adjusted under 35 U.S.C. 154(b) by 138 days.

(21) Appl. No.: 13/173,236

(22) Filed: Jun. 30, 2011

(65) Prior Publication Data

US 2012/0001557 A1 Jan. 5, 2012

(30) Foreign Application Priority Data

Jul. 2, 2010 (JP) .................................. 2010-151967
Jan. 26, 2011 (JP) .................................. 2011-014402

(51) Int. Cl.
*H05B 37/00* (2006.01)

(52) U.S. Cl.
USPC ........... 315/318; 315/294; 315/297; 315/312; 315/360; 315/169.2; 323/212; 323/237; 323/241; 345/102; 345/690; 345/691; 345/204; 345/99

(58) Field of Classification Search
USPC ............... 315/185 R, 169.1–169.3, 294, 297, 315/307, 312, 318, 360; 345/39, 42, 46, 77, 345/82, 98, 99, 102, 204, 690; 323/212, 237, 323/241, 271, 277, 280, 282
See application file for complete search history.

(56) References Cited

U.S. PATENT DOCUMENTS

| | | | |
|---|---|---|---|
| 8,248,439 B2 * | 8/2012 | Ran et al. ...................... | 345/690 |
| 2011/0279043 A1 * | 11/2011 | Hagino et al. ............ | 315/185 R |
| 2012/0188487 A1 * | 7/2012 | Hagino et al. .................. | 349/69 |

FOREIGN PATENT DOCUMENTS

| | | |
|---|---|---|
| JP | 2009-188135 A | 8/2009 |
| JP | 2010-15967 A | 1/2010 |

* cited by examiner

*Primary Examiner* — Haiss Philogene
(74) *Attorney, Agent, or Firm* — Cantor Colburn LLP

(57) ABSTRACT

A positive counter starts counting, starting with an initial value, upon receiving a positive edge of a dimming pulse signal. A negative edge counter starts counting, starting with an initial value, upon receiving a negative edge of the dimming pulse signal. For each i-th ($2 \leq i \leq n$) channel, the phase shift amount is calculated by multiplying a period count value that indicates the period of the dimming pulse signal by $(i-1)/n$. When the count value matches the phase shift amount, a burst control signal is switched to a first level. When the count value matches the phase shift amount, the burst control signal is switched to a second level.

9 Claims, 10 Drawing Sheets

CHi_CONT

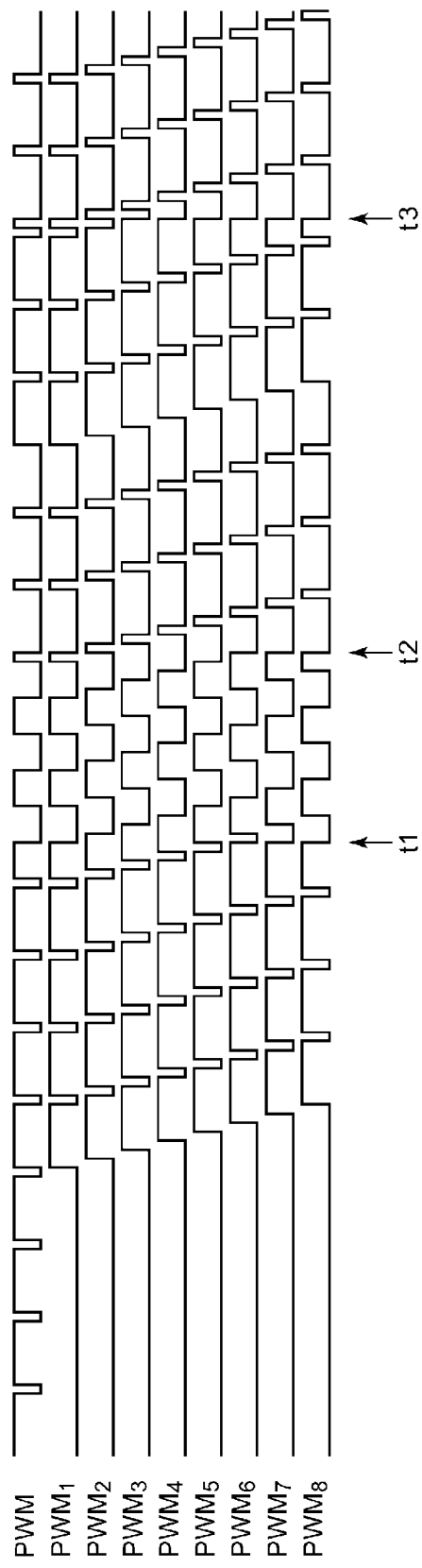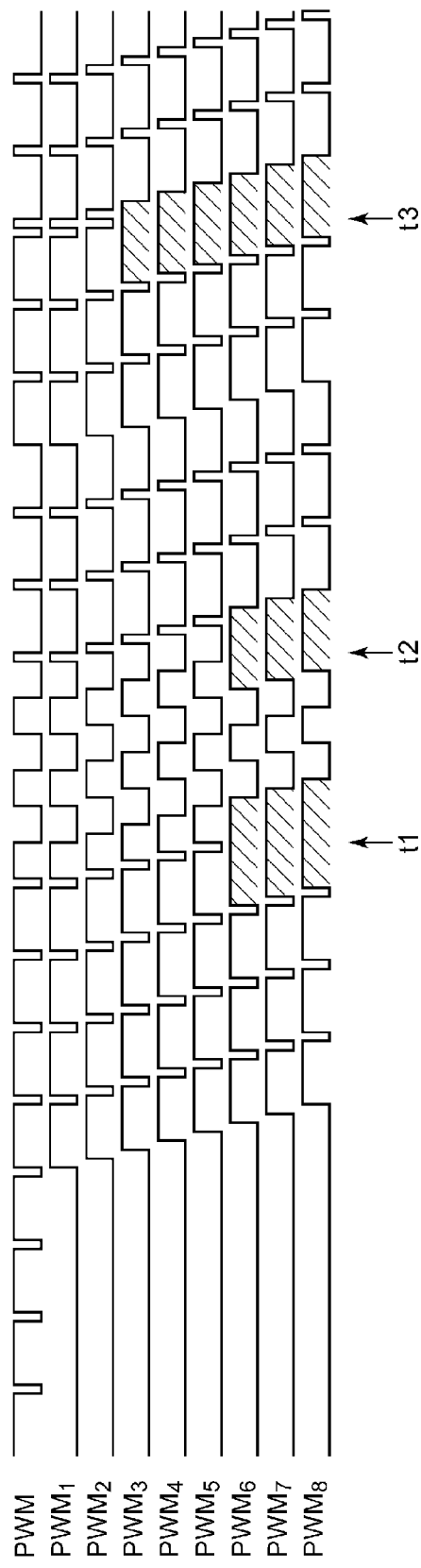

PHASE SHIFT CONTROLLER

BACKGROUND OF THE INVENTION

1. Field of the Invention

The present invention relates to a driving circuit for a light emitting diode.

2. Description of the Related Art

In recent years, as a backlight of a liquid crystal panel or as an illumination device, a light emitting apparatus is employed, which is configured using an LED (light emitting diode). FIG. 1 is a circuit diagram which shows a typical configuration of a light emitting apparatus. A light emitting apparatus 1003 includes multiple LED strings 1006_1 through 1006_n, a switching power supply 1004, and a current driving circuit 1008.

Each LED string 1006 includes multiple LEDs connected in series. The switching power supply 1004 boosts an input voltage Vin, and supplies a driving voltage Vout to one terminal of each of the LED strings 1006_1 through 1006_n.

The current driving circuit 1008 includes current sources $CS_1$ through $CS_n$ which are respectively provided to the LED strings 1006_1 through 1006_n. Each current source CS supplies, to the corresponding LED string 1006, a driving current $I_{LED}$ that corresponds to the target luminance level.

The switching power supply 1004 includes an output circuit 1102 and a control IC 1100. The output circuit 1102 includes an inductor L1, a switching transistor M1, a rectifier diode D1, and an output capacitor C1. The control IC 1100 controls the on/off duty ratio of the switching transistor M1 so as to adjust the driving voltage Vout.

With such a light emitting apparatus 1003, in some cases, in order to adjust the luminance level of each LED string 1006, a PWM (Pulse Width Modulation) control operation is performed on the on period $T_{ON}$ and the off period $T_{OFF}$ of the driving current $I_{LED}$. Such a control operation is also referred to as the "burst dimming control operation" or "burst driving control operation". Specifically, a burst controller 1009 of the current driving circuit 1008 receives pulse signals $PWM_1$ through $PWM_n$ each having a duty ratio that corresponds to the luminance level so as to perform a switching control operation on the respective current sources $CS_1$ through $CS_n$.

RELATED ART DOCUMENTS

[Patent Documents]
[Patent Document 1]
Japanese Patent Application Laid Open No. 2010-015967
[Patent Document 2]
Japanese Patent Application Laid Open No. 2009-188135

If the driving currents $I_{LED1}$ through $I_{LEDn}$ of the respective channels have uniform phases in the burst dimming operation, the output current Iout of the switching power supply 1004 concentrates at particular timings. In some cases, this becomes a factor contributing to ripple in the output voltage Vout or a cause of undesired noise. This problem can be solved by an arrangement configured to input the burst control signals $PWM_1$ through $PWM_n$ having phases shifted from one another such that the on periods $T_{ON}$ of the respective channels each have a different time offset.

However, with such a method (which is referred to as the "phase shift burst dimming method"), there is a need to generate the burst control signals $PWM_1$ through $PWM_n$ by means of a processor (DSP) external to the light emitting apparatus 1003, which imposes a heavy burden on the designer of liquid crystal TVs.

Furthermore, in a case in which there is a desire to make a design change with respect to the number of channels of LED strings, there is a need to change the design of the circuit configured to generate the burst control signals $PWM_1$ through $PWM_n$. This leads to a problem of increased design costs.

SUMMARY OF THE INVENTION

The present invention has been made in order to solve such a problem. Accordingly, it is an exemplary purpose of an embodiment of the present invention to provide a circuit which is capable of providing a phase shift burst dimming operation in a simple manner.

1. An embodiment of the present invention relates to a phase shift controller configured to receive a pulse-width modulated dimming pulse signal, and to generate n (n is an integer of 2 or more) burst control signals which are used to drive n channels of light emitting diode strings, each of which has the same period as that of the dimming pulse signal, and which have respective phases that differ from one another by 1/n the period of the dimming pulse signal. The phase shift controller comprises: a positive edge counter configured to start counting, starting with an initial value, upon receiving a positive edge of the dimming pulse signal; a negative edge counter configured to start counting, starting with an initial value, upon receiving a negative edge of the dimming pulse signal; a latch configured to receive a count value from at least one from among the positive edge counter and the negative edge counter, and to latch a period count value that corresponds to the period of the dimming pulse signal; and channel control units arranged for the respective second through n-th channels. The channel control unit of the i-th (2≦i≦n) channel is configured to perform: (A) an operation in which the phase shift amount of the corresponding channel is calculated by multiplying the period count value by (i–1)/n; (B) an operation in which, when the count value of the positive edge counter matches the phase shift amount of the corresponding channel, the burst control signal of the corresponding channel is switched to a first level; and (C) an operation in which, when the count value of the negative edge counter matches the phase shift amount of the corresponding channel, the burst control signal of the corresponding channel is switched to a second level.

Such an embodiment requires only a single dimming pulse signal to automatically generate a burst control signal for each channel by means of the phase shift controller. Thus, there is no need to employ an external processor to generate a signal for each channel, thereby facilitating system design. Furthermore, such an arrangement requires only two counters in the phase shift controller. Thus, such an arrangement provides a reduced circuit area as compared with a circuit including a counter for each channel.

Also, the channel control unit of the i-th channel may perform (D) an operation in which, when the burst control signal of the corresponding channel has not transited to the second level before a negative edge occurs in the dimming pulse signal, the corresponding burst control signal is switched to the second level at a timing at which the negative edge occurs in the dimming pulse signal.

Such an arrangement is capable of preventing the dimming pulse signal from remaining at a first level even if the duty ratio of the dimming pulse signal suddenly becomes smaller.

Another embodiment of the present invention relates to a light emitting apparatus. The light emitting apparatus comprises: multiple light emitting diode strings; a switching power supply configured to supply a driving voltage to the multiple light emitting diode strings; a phase shift controller according to any one of the aforementioned embodiments, configured to receive a pulse width modulated dimming pulse signal, and to generate a burst control signal for each of the multiple light emitting diode strings; and multiple current sources respectively arranged for the light emitting diode strings, and each configured to supply a driving current to a corresponding light emitting diode string when the corresponding burst control signal indicates the on period.

Yet another embodiment of the present invention relates to an electronic device. The electronic device comprises: a liquid crystal panel; and the aforementioned light emitting apparatus arranged as a backlight of the liquid crystal panel.

2. Yet another embodiment of the present invention relates to a driving circuit configured to drive a light emitting diode string. The driving circuit comprises: an output transistor configured as a PNP bipolar transistor and arranged such that the emitter thereof is connected to the cathode of the light emitting diode string; a heat dissipation resistor and a current control resistor sequentially arranged in series between the emitter of the output transistor and a fixed voltage terminal; an operational amplifier arranged such that the output terminal thereof is connected to the base of the output transistor, the non-inverting input terminal thereof is connected to a connection node that connects the heat dissipation resistor and the current control resistor, and a reference voltage is applied to the inverting input terminal; and a switching power supply configured to generate a driving voltage such that the electric potential at the base of the output transistor matches the reference voltage, and to supply the driving voltage thus generated to the anode of the light emitting diode string.

With such an embodiment, the collector-emitter voltage of the output transistor is reduced by the voltage drop that occurs at the heat dissipation resistor. Thus, such an arrangement is capable of reducing power consumption of the output transistor, i.e., of reducing its heat generation.

Also, the resistance value of the heat dissipation resistor may be determined such that the voltage drop that occurs at the heat dissipation resistor is equal to or greater than 20% of the base-emitter voltage of the output transistor.

Such an arrangement is capable of appropriately distributing power consumption between the output transistor and the heat dissipation resistor.

Yet another embodiment of the present invention relates to a light emitting apparatus. The light emitting apparatus comprises a light emitting diode string and a driving circuit according to any one of the aforementioned embodiments configured to drive the light emitting diode string.

Yet another embodiment of the present invention relates to an electronic device. The electronic device comprises a liquid crystal panel and the aforementioned light emitting apparatus arranged as a backlight of the liquid crystal panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 7A is a time chart which shows the operation of the burst controller according to an embodiment, and FIG. 7B is a time chart which shows a case in which a force reset operation is not performed according to a second reset signal;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

[First Embodiment]

Figure 1:
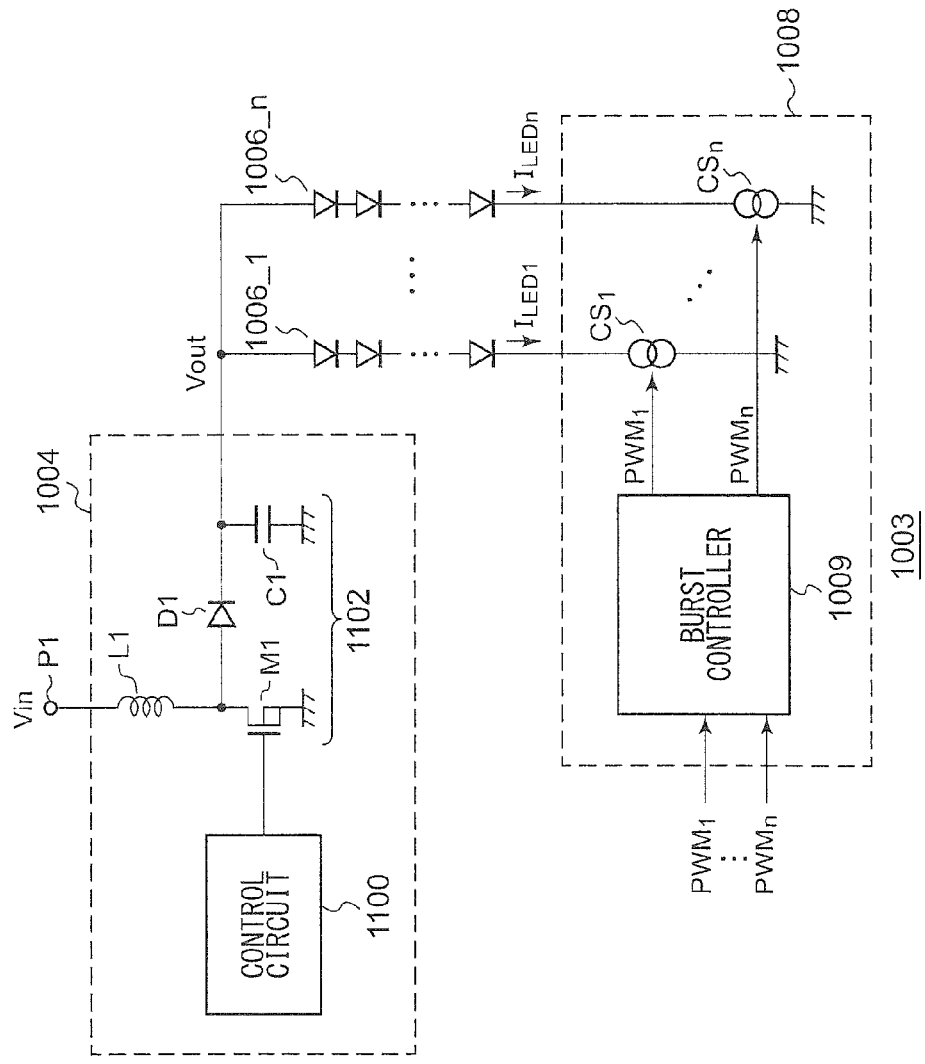
FIG. 1 is a circuit diagram which shows a configuration of a typical light emitting apparatus.
Figure 2:
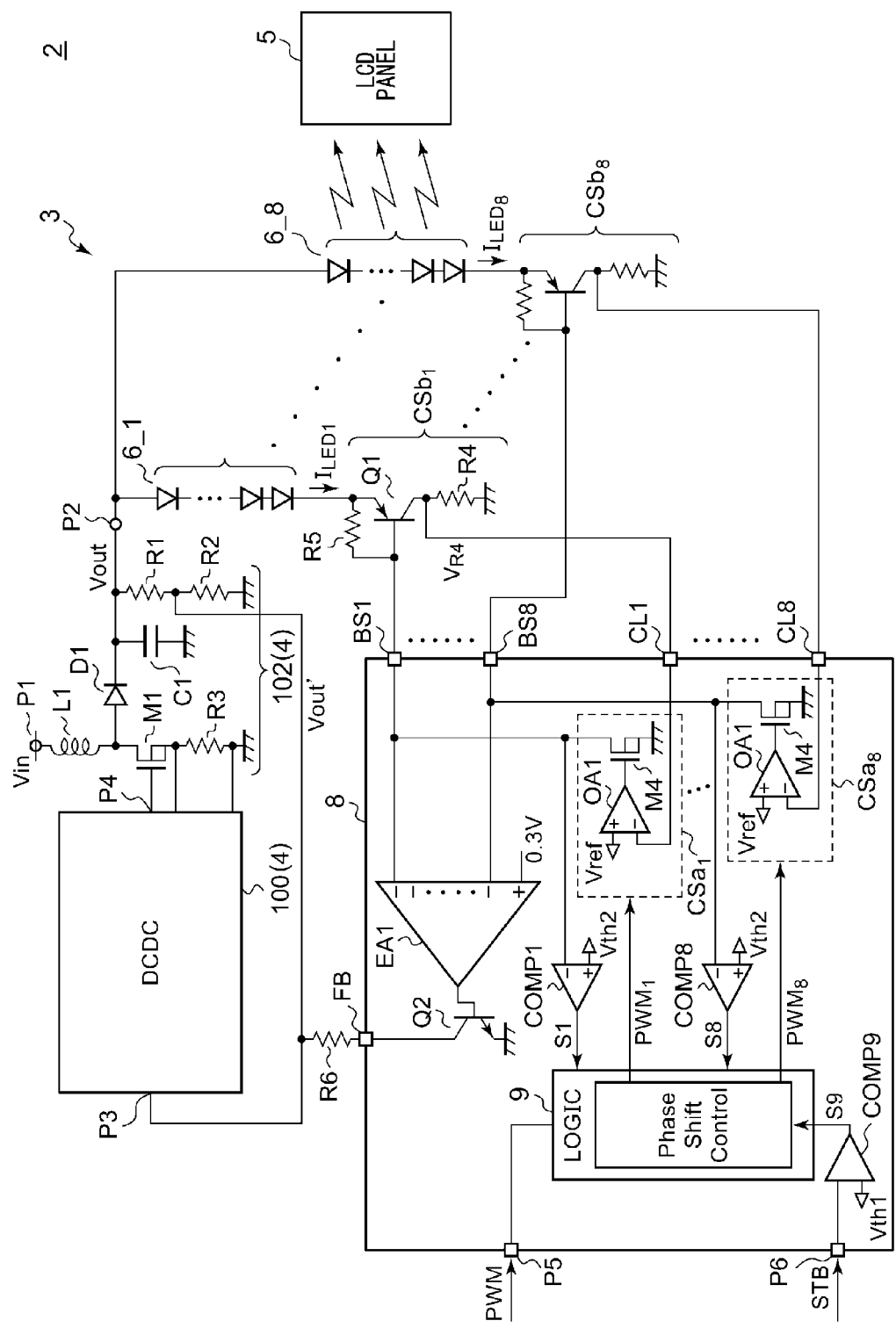
FIG. 2 is a circuit diagram which shows a configuration of an electronic device including a switching power supply according to a first embodiment.

FIG. 2 is a circuit diagram which shows a configuration of an electronic device including a switching power supply according to a first embodiment.

An electronic device 2 is configured as a battery-driven device such as a laptop PC, a digital still camera, a digital video camera, a cellular phone terminal, a PDA (Personal Digital Assistant), or the like. The electronic device 2 includes a light emitting apparatus 3 and an LCD (Liquid Crystal Display) panel 5. The light emitting apparatus 3 is arranged as a backlight of the LCD panel 5.

The light emitting apparatus 3 includes LED strings 6_1 through 6_8 each configured as a light emitting element, a current driving circuit 8, and a switching power supply 4. There is a maximum number of n (eight) effective channels, and the number of channels is determined by the designer of the electronic device based on the size of the LCD panel 5, the kind of electronic device 2, etc. That is to say, the number of channels, i.e., n, can be set to any number from 1 to 8 as desired.

Each LED string 6 includes multiple LEDs connected in series. The switching power supply 4 is configured as a step-up DC/DC converter, and is configured to boost an input voltage (e.g., battery voltage) Vin input to an input voltage terminal P1, and to output an output voltage (driving voltage) Vout via an output terminal P2. One terminal (anode) of each of the multiple LED strings 6_1 through 6_n is connected to the output terminal P2 so as to form a common anode terminal.

The switching power supply 4 includes a control IC 100 and an output circuit 102. The output circuit 102 includes an inductor L1, a rectifier diode D1, a switching transistor M1, and an output capacitor C1. The output circuit 102 has a typical topology, and accordingly, description thereof will be omitted.

A switching terminal P4 of the control IC 100 is connected to the gate of the switching transistor M1. The control IC 100 adjusts the on/off duty ratio of the switching transistor M1 by means of feedback control so as to provide the output voltage Vout required to turn on the LED strings 6. It should be noted that the switching transistor M1 may be configured as a built-in component included in the control IC 100.

A pair of resistors R1 and R2 divides the output voltage Vout so as to generate a feedback voltage Vout' that corresponds to the output voltage Vout. The feedback voltage Vout' is input to a feedback terminal P3 (OVP terminal). If the feedback voltage Vout' exceeds a threshold value, an overvoltage protection circuit (not shown) performs overvoltage protection.

The current driving circuit 8 is arranged on the other terminal (cathode) side of the multiple LED strings 6_1 through 6_n. The current driving circuit 8 supplies respective intermittent driving currents $I_{LED1}$ through $I_{LEDn}$ to the LED strings 6_1 through 6_n according to the target luminance level.

The current driving circuit 8 includes: multiple current sources $CS_1$ through $CS_n$ provided to the respective channels; a burst controller 9; a control input terminal P5; burst dimming terminals BS1 through BS8 provided for the respective channels; current control terminals CL1 through CL8 provided for the respective channels; comparators COMP1 through COMP8 provided for the respective channels; and a comparator COMP9.

The i-th current source $CS_i$ supplies the driving current $I_{LEDi}$ to the corresponding LED string 6_i. The current source $CS_i$ includes an output circuit $CSb_i$ and a channel control unit $CSa_i$. The output circuit $CSb_i$ includes an output transistor Q1, a current control resistor R4, and a pull-up resistor R5. The output transistor Q1 and the current control resistor R4 are sequentially arranged in series between the cathode of the LED string 6_i and a fixed voltage terminal (ground terminal). The voltage $V_{R4}$ at a connection node that connects the output transistor Q1 and the current control resistor R4, i.e., the voltage drop that occurs at the current control resistor R4, is input to the current control terminal CLi. The pull-up resistor R5 is arranged between the base and the emitter of the output transistor Q1. The other channels are configured in the same way.

At the resistor R4, the voltage drop $V_{R4}$ occurs, which is proportional to the driving current $I_{LEDi}$.

$$V_{R4} = I_{LEDi} \times R4$$

The channel control unit $CSa_i$ adjusts the base voltage of the output transistor Q1 such that the corresponding voltage drop $V_{R4}$ matches a reference voltage Vref. That is to say, the relation $I_{LEDi} = Vref/R4$ holds true in the on period.

The channel control unit $CSa_i$ includes an operational amplifier OA1 and a transistor M4. The transistor M4 is arranged between the burst dimming terminal BSi and the ground terminal. The reference voltage Vref is input to the non-inverting input terminal (+) of the operational amplifier OA1, and the voltage $V_{R4}$ at the current control terminal CL is input to the inverting input terminal (−) thereof. The output terminal of the operational amplifier OA1 is connected to the gate of the transistor M4. Feedback control is performed via the current source $CS_i$ such that the relation $V_{R4} = Vref$ holds true. Thus, such an arrangement is capable of generating the driving current $I_{LEDi}$ for each channel according to the reference voltage Vref.

Each channel control unit $CSa_i$ can be regarded as a single operational amplifier. In this case, the output terminal of such an operational amplifier $CSa_i$ corresponds to the drain of the transistor M4. Furthermore, the output of the operational amplifier OA1 is inverted by the transistor M4. Thus, the inverting input terminal (−) of the operational amplifier OA1 corresponds to the non-inverting input terminal (+) of the operational amplifier $CSa_i$, and the non-inverting input terminal (+) of the operational amplifier OA1 corresponds to the inverting input terminal (−) of the operational amplifier $CSa_i$. That is to say, the output terminal of the operational amplifier $CSa_i$ is connected to the base of the output transistor Q1. The non-inverting input terminal thereof (i.e., the inverting input terminal of the operational amplifier OA1) is connected to a connection node that connects a heat dissipation resistor R7 and the current control resistor R4. The reference voltage Vref is applied to the inverting input terminal of the operational amplifier $CSa_i$.

The control input terminal P5 receives, as an input signal, a pulse-width modulated dimming pulse signal PWM to be used in the burst dimming operation. The first level (e.g., high level) of the dimming pulse signal PWM indicates the on period $T_{ON}$ of the LED string 6, and the second level (e.g., low level) thereof indicates the off period $T_{OFF}$. The duty ratio of the PWM dimming pulse signal PWM, i.e., the ratio between the on period $T_{ON}$ and the off period $T_{OFF}$, is provided as common information used for all the channels.

The burst controller 9 is capable of switching the mode as follows according to the voltage levels $V_{BS1}$ through $V_{BS8}$ at the respective burst dimming terminals BS1 through BS8 of the eight respective channels.

a. All Channel Common Mode $\phi_{COM}$

In this mode, the burst controller 9 does not perform phase shifting. The burst controller 9 drives the LED strings of all the channels to be driven with driving currents $I_{LED}$ having a uniform phase, regardless of the connected LED strings 6. In this mode, there is a zero phase difference between the driving currents for the respective channels. Accordingly, this mode will also be represented by $\phi_0$.

b. Phase Shift Mode $\phi_{SHIFT}$

In this mode, the burst controller 9 drives the light emitting diode strings of the n ($1 \leq n \leq 8$) channels to be driven such that the phases of the driving currents for the respective channels are shifted by 1/n the period of the dimming pulse signal PWM. The phase shift mode b includes the following three modes.

b1. 90-Degree Phase Shift Mode $\phi_{90}$

In this mode, the first through the fourth channels are to be driven. The phases of the driving currents $I_{LED1}$ through $I_{LED4}$ to be applied to the LED strings 6_1 through LED 6_4 are shifted from one another by ¼ the period of the dimming pulse signal PWM.

b2. 60-Degree Phase Shift Mode $\phi_{60}$

In this mode, the phases of the driving currents $I_{LED1}$ through $I_{LED6}$ to be applied to the LED strings 6_1 through LED 6_6 of the first through the sixth channels are shifted from one another by ⅙ the period of the dimming pulse signal PWM.

b3. 45-Degree Phase Shift Mode $\phi_{45}$

In this mode, the phases of the driving currents $I_{LED1}$ through $I_{LED6}$ to be applied to the LED strings 6_1 through LED 6_8 of the first through the eighth channels are shifted from one another by ⅛ the period of the dimming pulse signal PWM.

The burst controller (phase shift controller) 9 generates the burst control signals $PWM_1$ through $PWM_8$ that correspond to the respective mode, and supplies the burst control signals thus generated to the respective current sources $CS_1$ through $CS_8$. When the burst control signal $PWM_i$ is high level, the current source $CS_i$ is set to the operating state in which it generates the driving current $I_{LEDi}$, whereby the period becomes the on period $T_{ON}$. Conversely, when the burst control signal $PWM_i$ is low level, the current source $CS_i$ is set to the stopped state, whereby the period becomes the off period $T_{OFF}$.

A judgment period $T_{JDG}$ occurs after the current driving circuit 8 is started up. The judgment period $T_{JDG}$ has a length that is several times the period of the dimming pulse signal PWM, for example. Specifically, the judgment period $T_{JDG}$ has a length that is on the order of three times the period of the dimming pulse signal PWM. In the judgment period $T_{JDG}$, the burst controller 9 determines the mode based on the voltage levels $V_{BS1}$ through $V_{BS8}$ at the burst dimming terminals BS1 through BS8 of the eight respective channels.

For example, the burst controller 9 determines the operating mode according to the voltage level $V_{STB}$ of the standby signal STB. When the voltage level $V_{STB}$ of the standby signal STB is included in a predetermined first range, the mode is set to the all channel common mode $\phi_0$. The comparator COMP9 compares the voltage $V_{STB}$ with a threshold voltage Vth1, and outputs a judgment signal S9 which indicates the comparison result. When the judgment signal S9 indicates that the relation $V_{STB}$>Vth1 holds true, the burst controller 9 is set to the all channel common mode $\phi_0$.

When the voltage level $V_{STB}$ of the standby signal STB is included in a predetermined second voltage range, the burst controller 9 is set to the phase shift mode $\phi_{SHIFT}$. In the second voltage range, the relation $V_{STB}$<Vth1 holds true. Thus, when the judgment signal S9 indicates that the relation $V_{STB}$<Vth1 holds true, the burst controller 9 is set to the phase shift mode $\phi_{SHIFT}$.

Subsequently, the burst controller 9 thus set to the phase shift mode $\phi_{SHIFT}$ is set to any one of the 90-degree phase shift mode, the 60-degree phase shift mode, or the 45-degree phase shift mode, based on the voltage levels $V_{BS1}$ through $V_{BS8}$ at the burst dimming terminals BS of the respective channels.

The comparators COMP1 through COMP8 are provided for the respective channels, and are configured to compare the voltages $V_{BS1}$ through $V_{BS8}$ of the respective channels with a predetermined threshold voltage Vth2. The threshold voltage Vth2 is preferably set to a voltage on the order of 0.1 V, for example. The comparator COMPi of the i-th channel outputs a detection signal Si which is set to high level (H) when $V_{BSi}$<Vth2, and is set to low level (L) when $V_{BSi}$>Vth2.

When the LED string 6_i is connected to the i-th burst dimming terminal BSi, if the driving voltage $I_{LEDi}$ is zero, the voltage level $V_{BSi}$ at the i-th burst dimming terminal BSi rises up to the vicinity of the output voltage Vout. On the other hand, when the LED string 6_i is not connected to the burst dimming terminal BSi, the voltage level $V_{BSi}$ at the burst dimming terminal BSi drops to the vicinity of the ground voltage. That is to say, the output signal Si of the comparator COMPi indicates whether or not the LED string 6_i is connected.

When, in the judgment period $T_{JDG}$, the electric potentials $V_{BS5}$ through $V_{BS8}$ at the respective burst dimming terminals BS5 through BS8 of the respective fifth through eighth channels are all lower than the predetermined second threshold voltage Vth2, i.e., when the conditional expression S5=H && S6=H && S7=H && S8=H is satisfied, the burst controller 9 is set to the 90-degree phase shift mode $\phi_{90}$. This conditional expression represents a state in which the LED strings 6_5 through 6_8 are not connected to the fifth channel through the eighth channel. Here, "(A=B)" is an operator which indicates true (1) when A is equal to B, and false (0) when A is not equal to B. The symbol "&&" is an operator which represents the logical AND.

When the aforementioned conditional expression is not satisfied, the flow proceeds to step S106. When the electric potentials $V_{BS7}$ and $V_{BS8}$ at the burst dimming terminals BS7 and BS8 of the seventh and eighth channels are each lower than the second threshold voltage Vth2, i.e., when the conditional expression S7=H && S8=H is satisfied, the first through sixth channels are set as the channels to be driven. In this state, the mode is set to the 60-degree phase shift mode $\phi_{60}$.

Otherwise, all the channels are set as the channels to be driven. In this state, the mode is set to the 45-degree phase shift mode $\phi_{45}$.

As described above, judgment is made on a channel-by-channel basis regarding whether or not the LED string 6 is connected. An error amplifier EA1 amplifies the difference between the reference voltage (e.g., 0.3 V) and the lowest of the voltages $V_{BS}$ of the respective channels that are connected to the respective LED strings 6, so as to generate an error voltage Verr that corresponds to the difference between these voltages. The error voltage Verr is output from an FB terminal via a transistor Q2 and a resistor R6, and is input to the feedback terminal of the control IC 100. In the driving period, the control IC 100 adjusts the output voltage Vout such that the reference voltage (e.g., 0.3 V) matches the lowest of the voltages $V_{BS}$ at the respective channels to which LED strings 6 have been connected.

The above is the configuration of the light emitting apparatus 3. Next, description will be made regarding the burst controller 9.

The burst controller 9 receives the dimming pulse signal PWM, and generates the burst control signals $PWM_1$ through $PWM_n$ to be used to drive the light emitting diode strings of the respective n (n represents an integer of 2 or more) channels. The periods of the burst control signals $PWM_1$ through $PWM_n$ of the respective n channels are each equal to the period of the dimming pulse signal PWM. Furthermore, the burst control signals $PWM_1$ through $PWM_n$ have phases that are shifted from one another by 1/n the period of the dimming pulse signal PWM. In the 90-degree phase shift mode $\phi_{90}$, n is set to 4. In the 60-degree phase shift mode $\phi_{90}$, n is set to 6. In the 45-degree phase shift mode $\phi_{45}$, n is set to 8.

Figure 3:
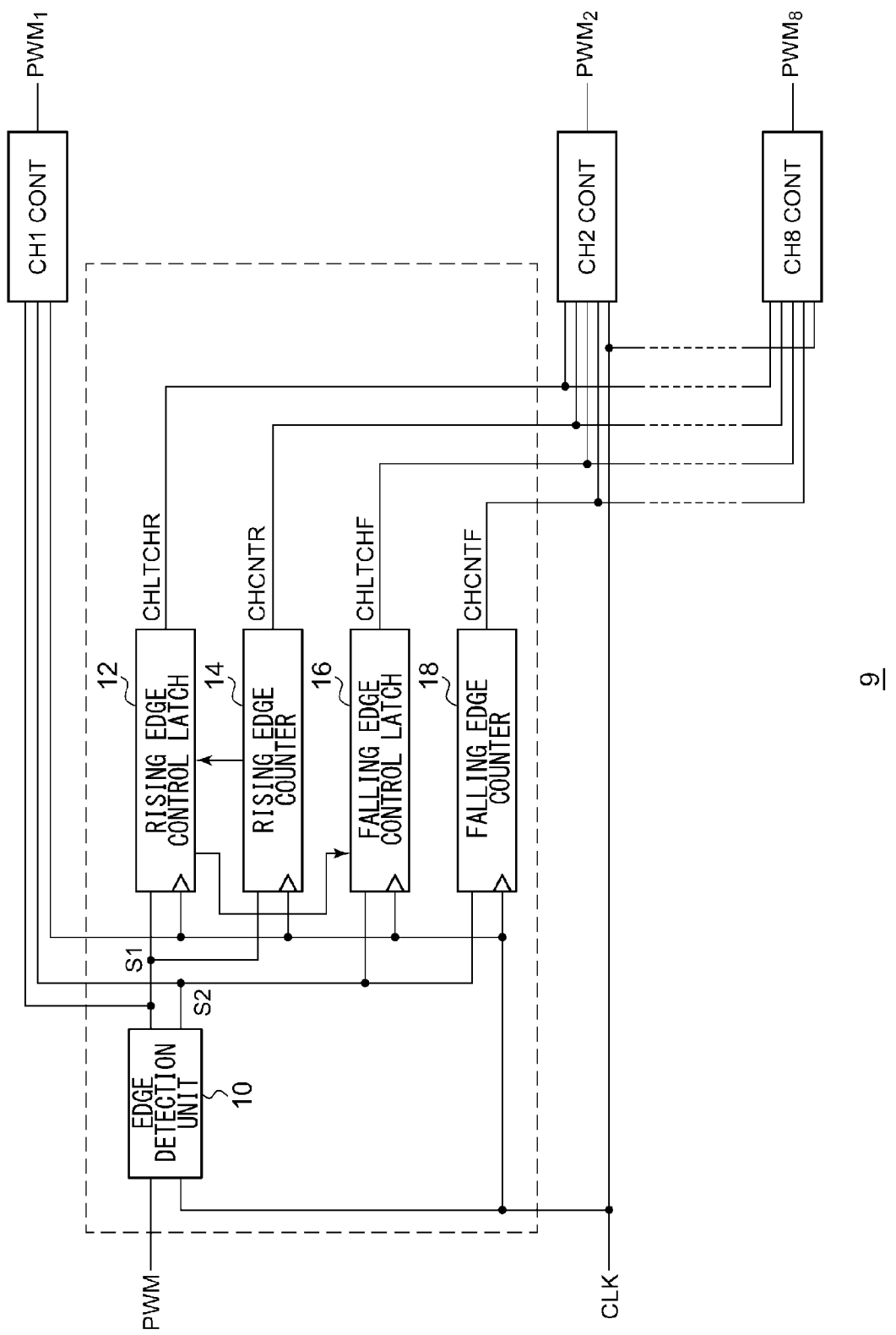
FIG. 3 is a block diagram which shows a configuration of a burst controller.

FIG. 3 is a block diagram which shows a configuration of the burst controller 9. Each block of the burst controller 9 is synchronized to a system clock CLK. The burst controller 9 includes an edge detection unit 10, a first latch 12, a positive edge counter 14, a second latch 16, a negative edge counter 18, and channel control units CH1_CONT through CHn_CONT.

The edge detection unit 10 receives the dimming pulse signal PWM, and generates a positive edge detection signal S1 which is asserted (set to high level, for example) every time a positive edge is detected, and a negative edge detection signal S2 which is asserted (set to high level, for example) every time a negative edge is detected.

The positive edge counter (rising edge counter) receives the positive edge detection signal S1. Upon detecting a positive edge of the dimming pulse signal PWM, the positive edge counter 14 starts counting, starting with an initial count value. The negative edge counter (falling edge counter) 18 receives the negative edge detection signal S2. Upon detecting a negative edge of the dimming pulse signal PWM, the negative edge counter 18 starts counting, starting with an initial count value. The first latch 12 receives the positive edge detection signal S1 and the count value of the positive edge counter 14, and latches the count value immediately before the positive edge counter 14 is reset. The first latch 12 holds the count value (period count value) CHLTCHR which represents the period of the dimming pulse signal PWM, which is updated for every period of the dimming pulse signal PWM. In the same way, the second latch 16 holds the period count value stored in the first latch 12 every time the negative edge detection signal S2 is asserted. The output value CHLTCHF of the second latch 16 is also updated for every period of the dimming pulse signal PWM, and also represents the period of the dimming pulse signal PWM. It should be noted that the second latch 16 may latch the count value of the negative edge counter 18.

The channel control units CH1_CONT through CH8_CONT are provided for the respective channels. The channel control unit CH1_CONT1 of the first channel outputs the dimming pulse signal PWM as it is.

The i-th channel control unit CHi_CONT ($2 \leq i \leq n$) performs the processing in the following steps (A) through (D) listed below.

(A) The channel control unit CHi_CONT calculates the phase shift amount $SHIFT_i$ of the corresponding channel by multiplying the period count value CHLTCH by $(i-1)/n$.

(B) When the count value CHCNTR of the positive edge counter 14 matches the phase shift amount SHFTi of the corresponding channel, the channel control unit CHi_CONT switches the burst control signal $PWM_i$ of the corresponding channel to the first level (e.g., high level).

(C) Furthermore, when the count value CHCNTF of the negative edge counter 18 matches the phase shift amount SHFTi of the corresponding channel, the channel control unit CHi_CONT switches the burst control signal $PWM_i$ of the corresponding channel to the second level (low level).

(D) Furthermore, when the burst control signal $PWM_i$ of the corresponding channel has not transited to the second level (low level) before the negative edge of the dimming pulse signal PWM, the channel control unit CHi_CONT switches the corresponding burst control signal $PWM_i$ to the second level (low level) at a timing at which a negative edge occurs in the dimming pulse signal PWM.

Figure 4:
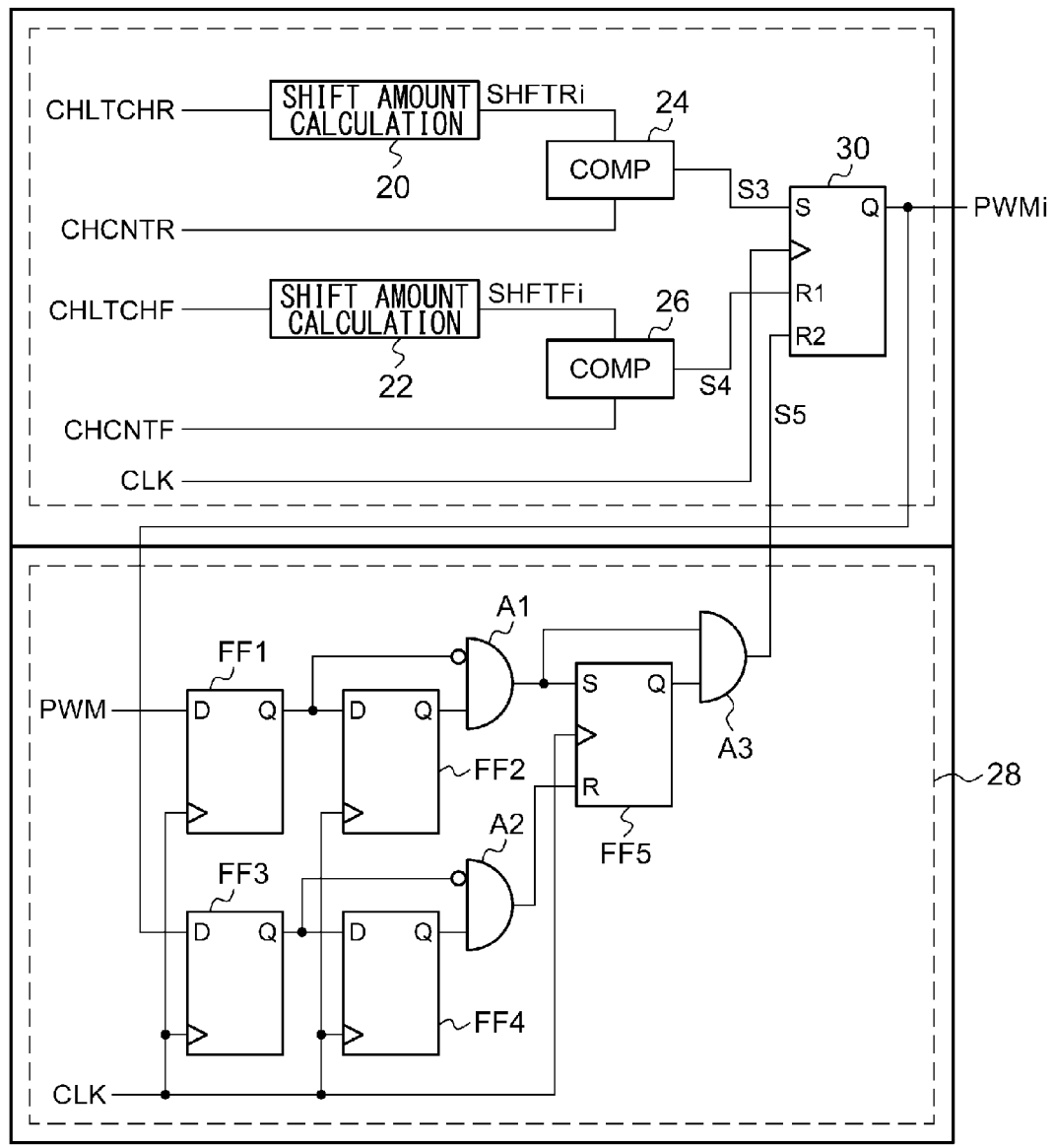
FIG. 4 is a block diagram which shows a configuration of a channel control unit.

FIG. 4 is a block diagram which shows a configuration of the channel control unit.

A first shift amount calculation unit 20 multiplies the period count value CHLTCHR stored in the first latch 12 by $(i-1)/n$, so as to calculate the phase shift amount $SHFTR_i$ of the channel. In the same way, a second shift amount calculation unit 22 multiplies the period count value CHLTCHF stored in the second latch 16 by $(i-1)/n$, so as to calculate the phase shift amount $SHFTF_i$ of the channel. The phase shift amounts $SHFTR_i$ and $SHFTF_i$ are equal to each other. Accordingly, either the first shift amount calculation unit 20 or the second shift amount calculation unit 22 may be eliminated.

A set circuit 24 generates a set signal S3 which is asserted when the count value CHCNTR of the positive edge counter 14 matches the phase shift amount $SHFTR_i$ of the corresponding channel.

A reset circuit 26 generates a first reset signal S4 which is asserted when the count value CHCNTF of the negative edge counter 18 matches the phase shift amount $SHFTF_i$ of the corresponding channel.

The set circuit 24 and the reset circuit 26 are each configured as a digital comparator.

A second reset circuit 28 generates a second reset signal S5 which is asserted at a timing at which a negative edge occurs in the dimming pulse signal PWM when the burst control signal $PWM_i$ of the corresponding channel has not transited to the second level (low level) before the negative edge occurs in the dimming pulse signal PWM. The second reset signal (which will also be referred to as the "forced reset signal") S5 is a signal that is used to forcibly switch the burst control signal $PWM_i$ to low level.

The set signal S3 is input to the set terminal (S) of an SR flip-flop 30. When the set signal S3 of the corresponding channel is asserted, the SR flip-flop 30 switches the burst control signal $PWM_i$ of the corresponding channel to the first level (high level). Furthermore, the first reset signal S4 and the second reset signal S5 are input to the reset terminals (R1 and R2) of the SR flip-flop 30. When the first reset signal S4 or the second reset signal S5 is asserted for the corresponding channel, the SR flip-flop 30 switches the burst control signal $PWM_i$ of the corresponding channel to the second level (low level).

The second reset circuit 28 includes flip-flops FF1 through FF4, AND gates A1 through A3, and an SR flip-flop FF5.

The first flip-flop FF1 latches the dimming pulse signal PWM. The second flip-flop FF2 latches the output of the first flip-flop FF1. The third flip-flop FF3 latches the burst control signal $PWM_i$ of the corresponding channel. The fourth flip-flop FF4 latches the output of the third flip-flop FF3.

The first AND gate A1 generates the logical AND of the inverted output signal of the first flip-flop FF1 and the output signal of the second flip-flop FF2. The second AND gate A2 generates the logical AND of the inverted output signal of the third flip-flop FF3 and the output signal of the fourth flip-flop FF4.

The output signal of the first AND gate is input to the set terminal of the SR flip-flop FF5, and the output signal of the second AND gate is input to the reset terminal thereof. The third AND gate A3 generates, as the second reset signal S5, the logical AND of the output signal of the first AND gate A1 and the output signal of the SR flip-flop FF5.

The first-channel channel control unit CH1_CONT may be configured as an SR flip-flop configured to be set according to the positive edge detection signal S1, and to be reset according to the negative edge detection signal S2.

The above is the configuration of the burst controller 9. Next, description will be made regarding the operation thereof.

Figure 5:
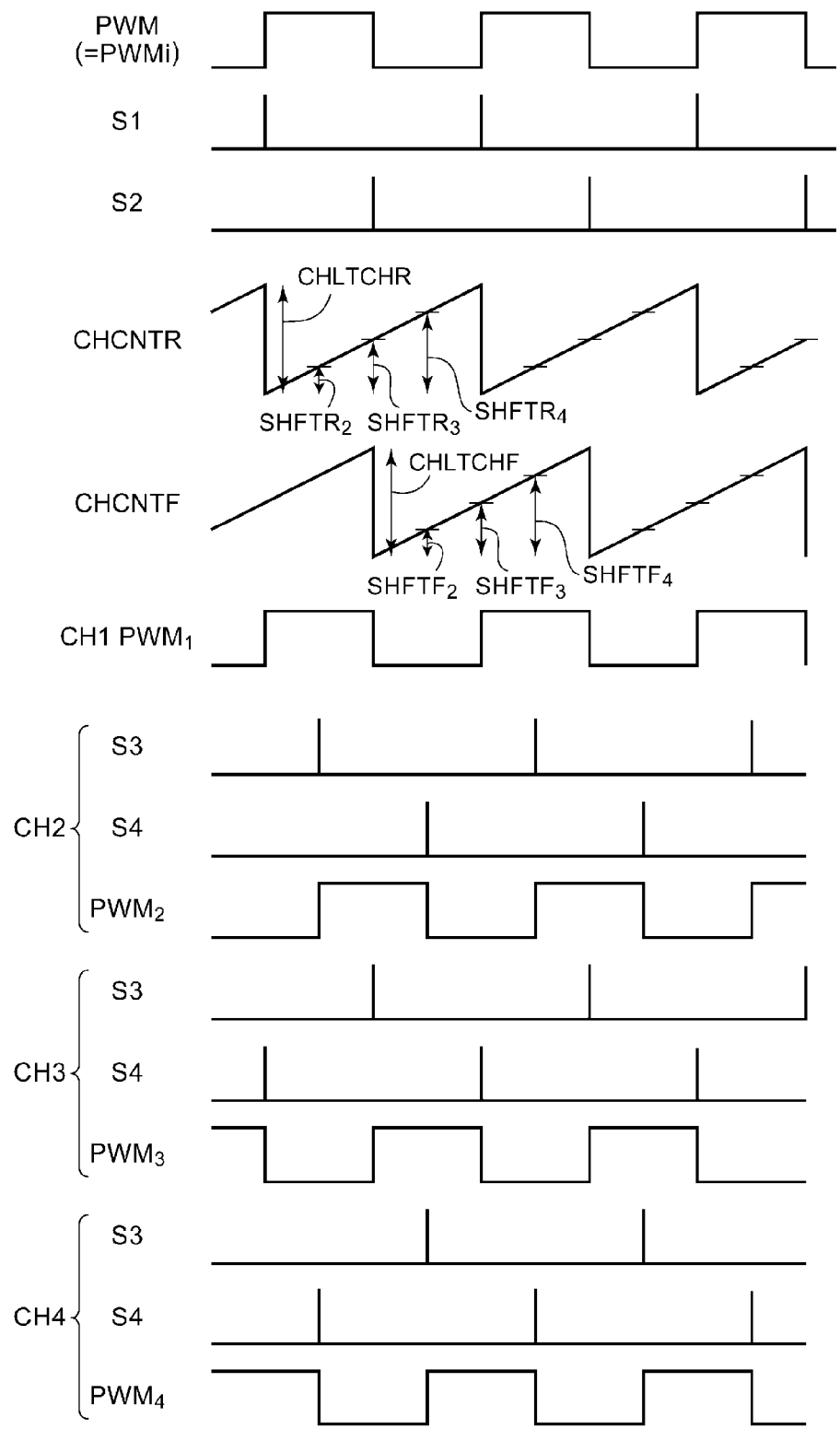
FIG. 5 is a time chart which shows the operation of the burst controller according to an embodiment.

FIG. 5 is a time chart which shows the operation of the burst controller 9 according to an embodiment. This time chart shows a case in which n=4. With the current driving circuit 8 according to the embodiment, such an arrangement is capable of automatically setting the phase shift angle according to the number of LED strings 6 that have been connected. That is to say, such an arrangement is capable of switching the mode between the 90-degree phase shift mode, the 60-degree phase shift mode, and the 45-degree phase shift mode, according to the number of LED strings that have been connected when the standby signal STB is included in the second voltage range. Such an arrangement only requires the user to supply the standby signal STB that corresponds to a desired operating mode and the single dimming pulse signal PWM having a duty ratio that corresponds to a desired luminance level, thereby allowing the LED strings 6 to be driven in a simple manner.

Furthermore, by means of the burst controller 9, such an arrangement is capable of appropriately generating the burst control signals $PWM_1$ through $PWM_n$ for the respective channels. Furthermore, such an arrangement does not require the dimming pulse signal PWM to have a fixed period. That is to say, such an arrangement supports a dimming pulse signal PWM that has a variable period.

Furthermore, the burst controller 9 requires only two counters regardless of the number of channels, which is another advantage. This advantage can be clearly understood by comparison with a burst controller according to a comparison technique.

Figure 6:
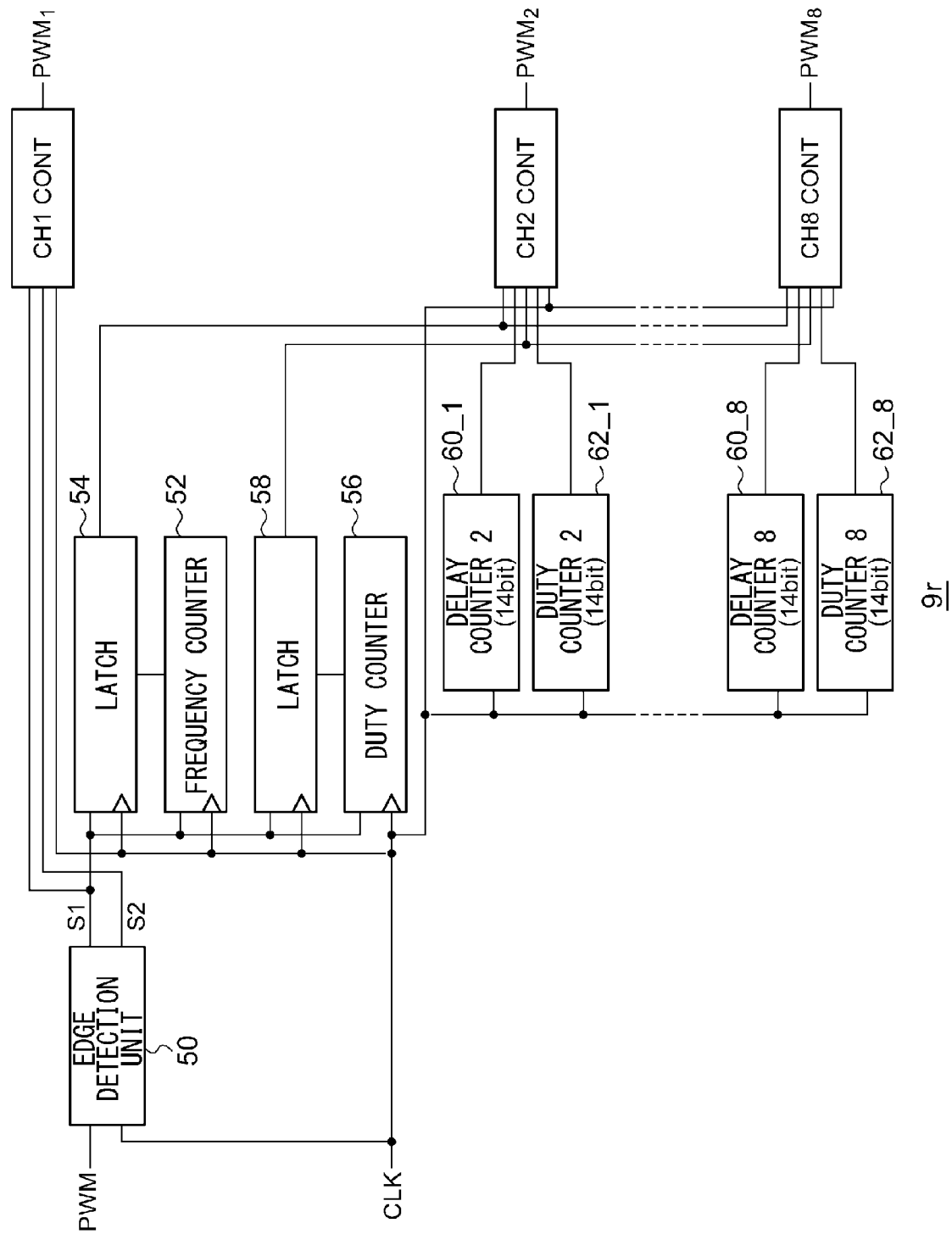
FIG. 6 is a block diagram which shows a configuration of a burst controller according to a comparison technique.

FIG. 6 is a block diagram which shows a configuration of a burst controller 9r according to a comparison technique.

With such a comparison technique, a frequency counter 52 counts the period of the dimming pulse signal PWM. A latch 54 latches the period thus counted. A duty counter 56 measures the high-level period (on period) of the dimming pulse signal PWM, and a latch 58 latches the on period thus measured.

The delay counter 60 and the duty counter 62 are provided for each channel. The delay counters 60_2 through 60_8 each start counting, starting with a positive edge of the dimming pulse signal PWM. When the count value of the delay counter 60 matches the shift amount which is calculated for each channel, the channel control unit CHi_CONT sets the burst control signal $PWM_i$ of the corresponding channel to the first level. After the burst control signal $PWM_i$ transits to the first level, the duty counter 62 starts counting. When the count value matches the on period of the dimming pulse signal PWM, the channel control unit CHi_CONT sets the burst control signal $PWM_i$ to the second level.

With such a comparison technique, the delay counter 60 and the duty counter 62 are required to be provided for each channel, in addition to the frequency counter 52 and the duty counter 56. An increase in the number of channels is thus accompanied by an increased circuit area. In contrast, the burst controller 9 according the embodiment requires only two counters regardless of the number of channels, thereby providing a reduced circuit area.

FIG. 7A is a time chart which shows the operation of the burst controller 9 according to the embodiment. This time chart shows a case in which n=8. Furthermore, this time chart shows a situation in which the period of the dimming pulse signal PWM or the duty ratio thereof suddenly changes.

For example, at the timing t1 or t2, the forced reset signal S5 is asserted for the sixth through eighth channels, thereby setting the burst control signal $PWM_6$ through $PWM_8$ of the respective sixth through eighth channels to low level. At a timing t3, the forced reset signal S5 is asserted for the third through eighth channels, thereby setting the burst control signals $PWM_3$ through $PWM_8$ of the respective channels to low level.

FIG. 7B is a time chart which shows an arrangement in which the burst controller 9 does not execute the operation shown in step (D), i.e., an arrangement in which the burst controller 9 does not generate the forced reset signal. In this case, the burst control signals $PWM_6$ through $PWM_8$ of the respective sixth through eighth channels each remain at high level over a period including the timings t1 and t2. Such a period is shown as a hatched region. If the burst control signal $PWM_i$ remains at high level during multiple periods, such an arrangement has a problem in that the LED string 6 emits light at an unintended high luminance level. With the burst controller 9 according to the embodiment, by providing the operation (D), such an arrangement solves such a problem.

[Second Embodiment]

Figure 8:
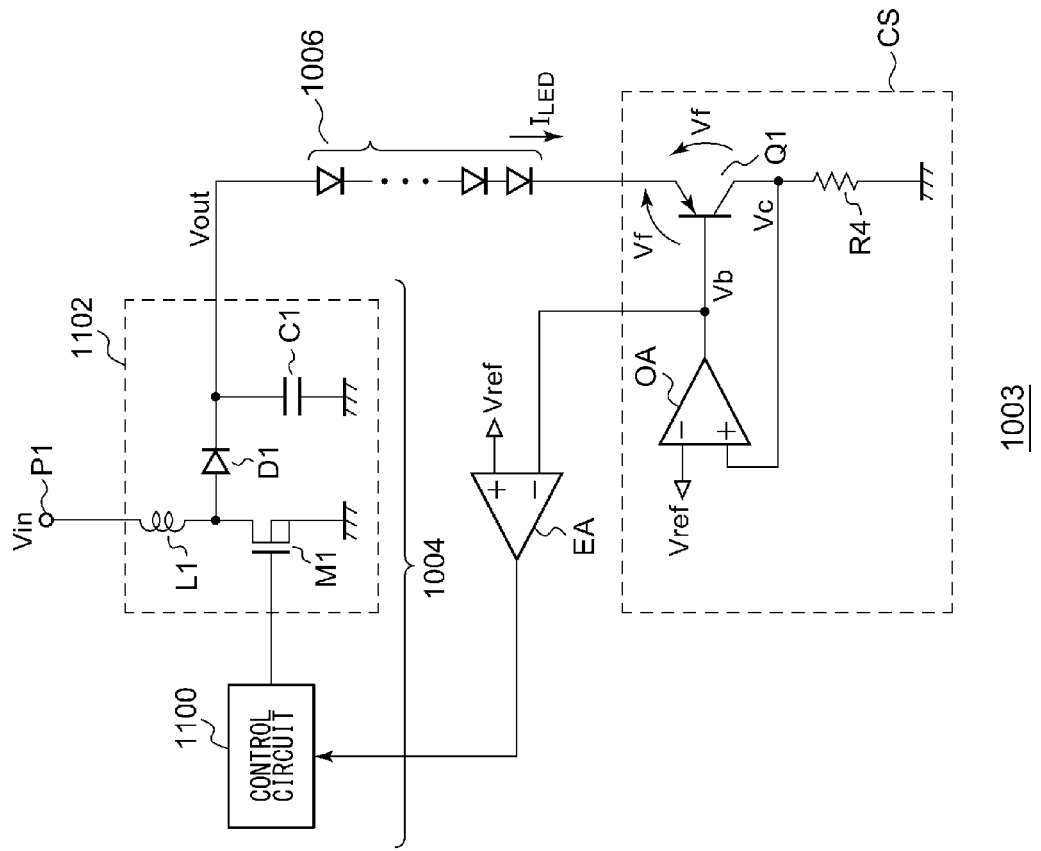
FIG. 8 is a circuit diagram which shows a configuration of a light emitting apparatus as investigated by the present inventor.

In recent years, as a backlight of a liquid crystal panel or an illumination device, a light emitting apparatus using an LED (light emitting diode) is employed. FIG. 8 is a circuit diagram which shows a configuration of a light emitting apparatus investigated by the present inventor. A light emitting apparatus 1003 includes an LED string 1006, a switching power supply 1004, and a current source CS.

The LED string 1006 includes multiple LEDs connected in series. The switching power supply 1004 boosts an input voltage Vin so as to supply a driving voltage Vout to one terminal of the LED string 1006.

The current source CS is arranged on a path of the LED string 1006. The current source CS supplies a driving current $I_{LED}$ to the corresponding LED string 1006 according to the target luminance level. The current source CS includes an output transistor Q1, a current control resistor R4, and an operational amplifier OA. The output transistor Q1 is configured as a PNP bipolar transistor, and is arranged on a path of the driving current $I_{LED}$. The current control resistor R4 is arranged between the collector of the output transistor Q1 and the ground terminal. The operational amplifier OA is arranged such that the output terminal thereof is connected to the base of the output transistor Q1, the non-inverting input terminal thereof is connected to the collector of the output transistor Q1, and a reference voltage Vref is input to the inverting input terminal thereof.

By means of the current source CS, such an arrangement performs feedback control such that the collector electric potential of the output transistor Q1, i.e., the voltage drop that occurs at the current control resistor R4, matches the reference voltage Vref, thereby setting the driving current $I_{LED}$ to a value that corresponds to the reference voltage Vref.

$I_{LED} = Vref/R4.$

The switching power supply 1004 includes an output circuit 1102 and a control IC 1100. The output circuit 1102 includes an inductor L1, a switching transistor M1, a rectifier diode D1, and an output capacitor C1. The control IC 1100 controls the on/off duty ratio of the switching transistor M1 so as to adjust the driving voltage Vout. The error amplifier EA amplifies the difference between the base voltage Vb of the output transistor Q1 and the reference voltage Vref. The control IC 1100 receives the output signal of the error amplifier EA, and adjusts the output voltage Vout such that the base voltage Vb matches the reference voltage Vref.

With the light emitting apparatus 1003 shown in FIG. 8, the base voltage Vb and the collector voltage Vc of the output transistor Q1 are adjusted such that they are each equal to the reference voltage Vref. Thus, the emitter-collector voltage of the output transistor Q1 becomes equal to the base-emitter voltage Vf thereof.

A transistor having a sufficiently low base-emitter voltage Vf is expensive. Accordingly, in some cases, in order to reduce the cost, a transistor having a large Vf is employed. If such a transistor having a large Vf is employed, such an arrangement leads to a large collector-emitter voltage of the output transistor Q1. This leads to increased power consumption of the output transistor Q1, resulting in increased heat generation.

Description will be made in a second embodiment regarding a current driving circuit which is capable of suppressing heat generation of a bipolar transistor.

Figure 9:
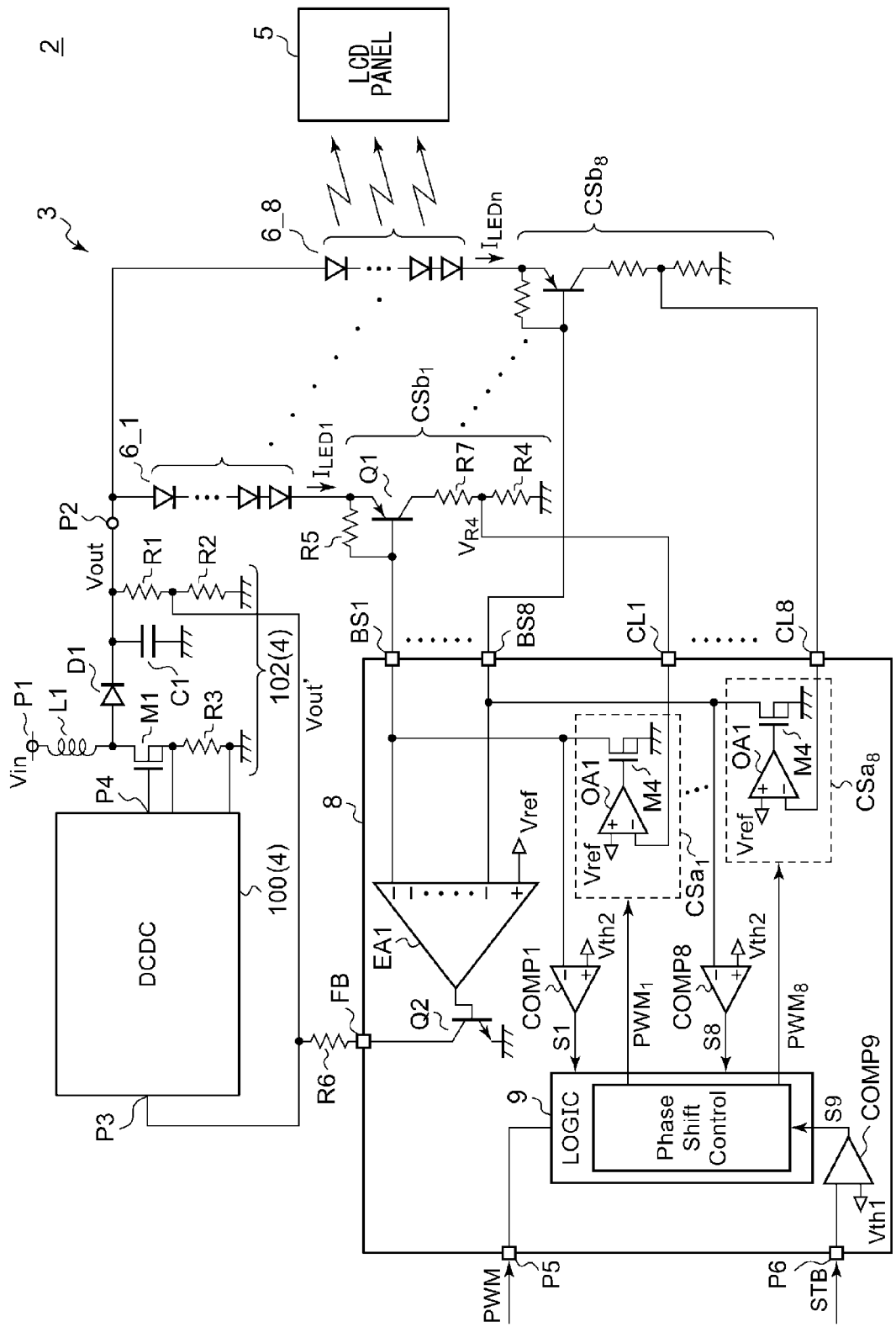
FIG. 9 is a circuit diagram which shows a configuration of an electronic device including a switching power supply according to a second embodiment.

FIG. 9 is a circuit diagram which shows a configuration of an electronic device including a switching power supply according to the second embodiment.

An electronic device 2 is configured as a battery-driven device such as a laptop PC, a digital still camera, a digital video camera, a cellular phone terminal, a PDA (Personal Digital Assistant), or the like, and includes a light emitting apparatus 3 and an LCD (Liquid Crystal Display) panel 5. The light emitting apparatus 3 is provided as a backlight for the LCD panel 5.

The light emitting apparatus 3 includes LED strings 6_1 through 6_n each configured as a light emitting element, a current driving circuit 8, and a switching power supply 4. The maximum number n of the channels is 8, which should be determined by the designer of the electronic device 2 based upon the size of the LCD panel 5 or the kind of the electronic device 2. That is to say, the number of the channels, i.e., n, can be determined as desired in a range from 1 to 8.

Each LED string 6 includes multiple LEDs connected in series. The switching power supply 4 is configured as a step-up DC/DC converter. The switching power supply 4 is configured to boost the input voltage (e.g., battery voltage) Vin input to an input terminal P1, and to output an output voltage (driving voltage) Vout via an output terminal P2. One terminal (anode) of each of the multiple LED strings 6_1 through 6_n is connected to the output terminal P2 so as to form a common anode terminal.

The switching power supply 4 includes a control IC 100 and an output circuit 102. The output circuit 102 includes an inductor L1, a rectifier diode D1, a switching transistor M1, and an output capacitor C1. The output circuit 102 has a typical topology, and accordingly, description thereof will be omitted.

A switching terminal P4 of the control IC 100 is connected to the gate of the switching transistor M1. The control IC 100 adjusts the on/off duty ratio of the switching transistor M1 by means of a feedback control operation so as to provide the output voltage Vout required to turn on the LED strings 6. It should be noted that the switching transistor M1 may be configured as a built-in component of the control IC 100.

The resistors R1 and R2 divide the output voltage Vout so as to generate a feedback voltage Vout' that corresponds to the output voltage Vout. The feedback voltage Vout' is input to a feedback terminal P3 (OVP terminal). When the feedback voltage Vout' exceeds a threshold value, an overvoltage protection circuit (not shown) performs an overvoltage protection operation.

The current driving circuit 8 is arranged on the other terminal (cathode) side of the multiple LED strings 6_1 through 6_n. The current driving circuit 8 respectively supplies, to the LED strings 6_1 through 6_n, intermittent driving currents $I_{LED1}$ through $I_{LEDn}$ that correspond to the respective target luminance levels.

The current driving circuit 8 includes multiple current sources $CS_1$ through $CS_n$ provided to the respective channels, a burst controller 9, a control input terminal P5, a standby terminal (STB terminal) P6, burst dimming terminals BS1 through BS8 provided to the respective channels, current control terminals CL1 through CL8 provided to the respective channels, comparators COMP1 through COMP8 provided to the respective channels, and a comparator COMP9.

The i-th current source $CS_i$ supplies a driving current $I_{LEDi}$ to the corresponding LED string 6_i. The current source $CS_i$ includes an output circuit $CSb_i$ and a control unit $CSa_i$. The output circuit $CSb_i$ includes an output transistor Q1, a current control resistor R4, a pull-up resistor R5, and a heat dissipation resistor R7. The output transistor Q1 is configured as a PNP bipolar transistor, and is arranged such that the emitter thereof is connected to the cathode of the LED string 6_i. The heat dissipation resistor R7 and the current control resistor R4 are sequentially arranged in series between the emitter of the output transistor Q1 and a fixed voltage terminal (ground terminal). A voltage $V_{R4}$ at a connection node that connects the heat dissipation resistor R7 and the current control resistor R4, i.e., the voltage drop that occurs at the current control resistor R4, is input to the current control terminal CLi. The pull-up resistor R5 is arranged between the base and emitter of the output transistor Q1. The other channels each have the same configuration.

At the resistor R4, a voltage drop $V_{R4}$ occurs in proportion to the driving current $I_{LEDi}$.

$$V_{R4}=I_{LEDi} \times R4$$

The control unit $CSa_i$ adjusts the base voltage of the output transistor Q1 such that the corresponding voltage drop $V_{R4}$ matches a reference voltage Vref. That is to say, in the on period, the relation $I_{LEDi}$=Vref/R4 holds true.

The control unit $CSa_i$ includes an operational amplifier OA1 and a transistor M4. The transistor M4 is arranged between the burst dimming terminal BSi and the ground terminal. The operational amplifier OA1 is arranged such that the reference voltage Vref is input to its non-inverting input terminal (+), and the voltage at the current control terminal CL, i.e., the voltage drop $V_{R4}$ that occurs at the current control resistor R4 is input to its inverting input terminal (−). The output voltage of the operational amplifier OA1 is input to the gate of the transistor M4. The current source $CS_i$ provides a feedback control operation such that the relation $V_{R4}$=Vref holds true, thereby allowing each channel to generate the driving current $I_{LEDi}$ that corresponds to the reference voltage Vref. It should be noted that the transistor M4 may be regarded as a part of the output stage of the operational amplifier OA4. Also, the transistor M4 may be omitted.

The control input terminal P5 receives, as an input signal, a pulse-width modulated dimming pulse signal PWM which is used in the burst dimming operation. The first level (e.g., high level) of the dimming pulse signal PWM indicates the on period $T_{ON}$ of the LED string 6, and the second level (e.g., low level) thereof indicates the off period $T_{OFF}$. The duty ratio of the PWM dimming pulse signal PWM, i.e., the ratio between the on period $T_{ON}$ and the off period $T_{OFF}$, is common information used by all the channels.

The standby terminal P6 receives, as an input signal, a standby signal STB which indicates the standby state and the operating state of the current driving circuit 8. Specifically, when the standby signal STB is low level (e.g., 0 to 0.8 V), the current driving circuit 8 enters the standby state. When the standby signal STB is high level (higher than 0.8 V), the current driving circuit 8 enters the operating state, in which it supplies a driving current to the LED strings 6.

The burst controller 9 has the following switchable modes. The mode is switched according to the signal level $V_{STB}$ of the standby signal STB, and the voltage levels $V_{BS1}$ through $V_{BS8}$ at the respective burst dimming terminals BS1 through BS8 for the eight respective channels.

a. All Channel Common Mode $\phi_{COM}$

In this mode, the burst controller 9 does not perform phase shifting. The burst controller 9 drives the LED strings of all the channels to be driven with driving currents $I_{LED}$ having a uniform phase, regardless of the connected LED strings 6. In this mode, there is a zero phase difference between the driving currents for the respective channels. Accordingly, this mode will also be represented by $\phi_0$.

b. Phase Shift Mode $\phi_{SHIFT}$

In this mode, the burst controller 9 drives the light emitting diode strings of the respective channels such that the phases of the driving currents for the respective channels are shifted from one another. The phase shift mode b includes the following three modes.

b1. 90-Degree Phase Shift Mode $\phi_{90}$

In this mode, the first through the fourth channels are to be driven. The phases of the driving currents $I_{LED1}$ through $T_{LED4}$ to be applied to the LED strings 6_1 through LED 6_4 are shifted from one another by ¼ the period of the dimming pulse signal PWM.

b2. 60-Degree Phase Shift Mode $\phi_{60}$

In this mode, the phases of the driving currents $I_{LEDi}$ through $I_{LED6}$ to be applied to the LED strings 6_1 through LED 6_6 of the first through the sixth channels are shifted from one another by ⅙ the period of the dimming pulse signal PWM.

b3. 45-Degree Phase Shift Mode $\phi_{45}$

In this mode, the phases of the driving currents $I_{LEDi}$ through $T_{LED8}$ to be applied to the LED strings 6_1 through LED 6_8 of the first through the eighth channels are shifted from one another by ⅛ the period of the dimming pulse signal PWM.

The burst controller 9 generates the burst control signals $PWM_1$ through $PWM_8$ according to the corresponding mode, and supplies the burst control signals $PWM_1$ through $PWM_8$ thus generated to the respective current sources $CS_1$ through $CS_8$. When the burst control signal $PWM_i$ is high level, the current source $CS_i$ enters the operating state in which it generates the driving current $I_{LEDi}$, which thereby becomes the ON period $T_{ON}$. Conversely, when the burst control signal $PWM_i$ is low level, the current source $CS_i$ enters the stopped state, which thereby becomes the off period $T_{OFF}$.

Figure 10:
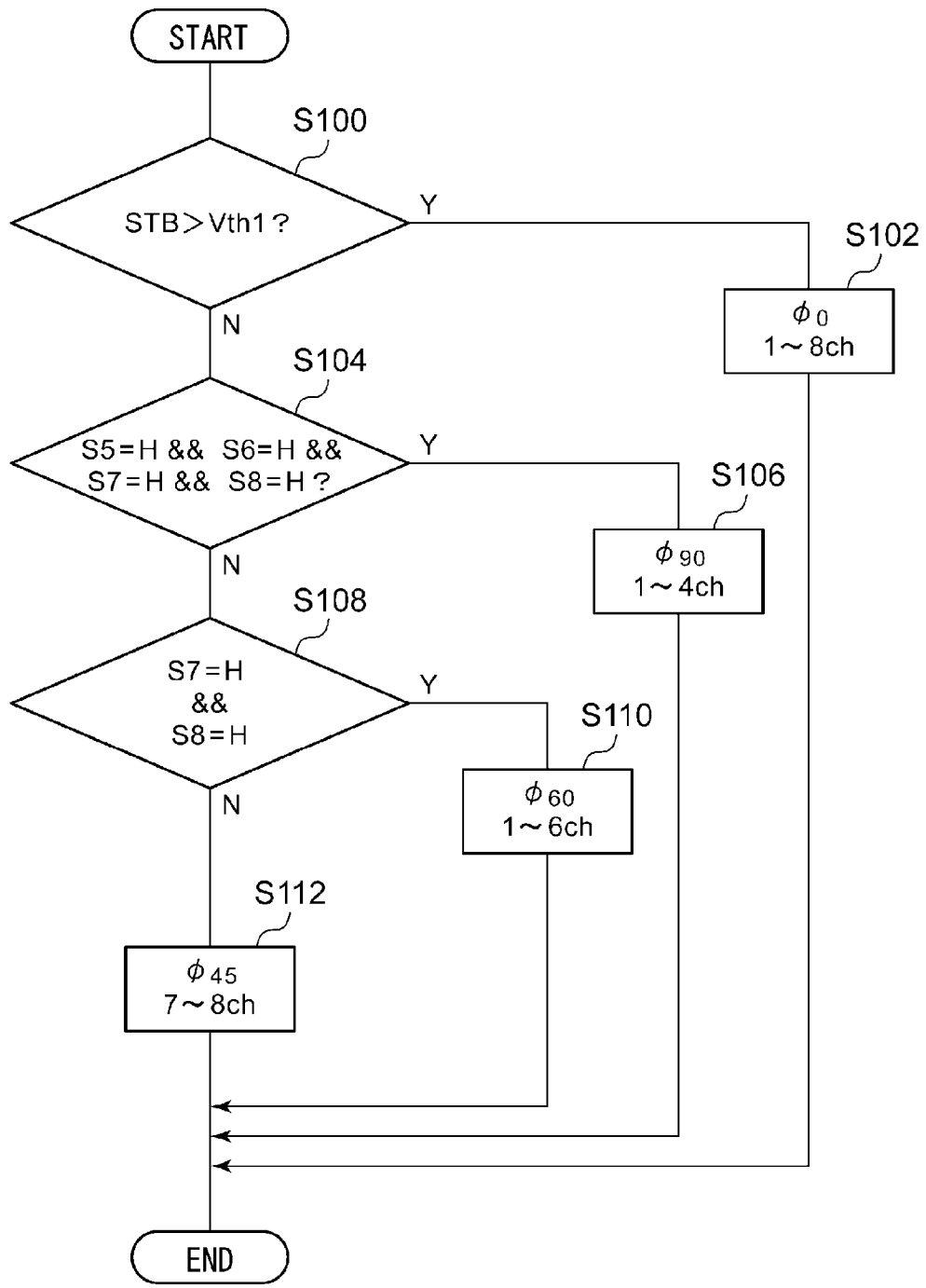
FIG. 10 is a flowchart according to which the operation mode of a current driving circuit shown in FIG. 9 is determined.

A judgment period $T_{JDG}$ is provided for a predetermined period after the standby signal STB switches from low level to high level, i.e., after the standby signal STB is asserted. The judgment period $T_{JDG}$ is on the order of several periods of the dimming pulse signal PWM, and specifically is on the order of three periods of the dimming pulse signal PWM. In the judgment period $T_{JDG}$, the burst controller 9 judges the mode based upon the voltage level $V_{STB}$ of the standby signal STB and the voltage levels $V_{BS1}$ through $V_{BS8}$ at the respective burst dimming terminals BS1 through BS8 of the eight respective channels. FIG. 10 is a flowchart for determining the operating mode of the current driving circuit 8 shown in FIG. 9.

First, the burst controller 9 determines the operating mode according to the voltage level $V_{STB}$ of the standby signal STB. When the voltage level $V_{STB}$ of the standby signal STB is included in a predetermined first range, the mode is set to the all channel common mode $\phi_0$. The comparator COMP9 compares the voltage $V_{STB}$ with a threshold voltage Vth1, and outputs a judgment signal S9 which represents the comparison result. When the judgment signal S9 represents the comparison result $V_{STB}$>Vth1 (YES in S100), the burst controller 9 sets the mode to the all channel common mode $\phi_0$ (S102).

When the voltage level $V_{STB}$ of the standby signal STB is included in a predetermined second voltage range, the burst controller 9 is set to the phase shift mode th $\phi_{SHIFT}$. The second voltage range is a range in which the relation $V_{STB}$<Vth1 is satisfied. Accordingly, when the judgment signal S9 represents the comparison result $V_{STB}$<Vth1 (NO in S100), the burst controller 9 is set to the phase shift mode $\phi_{SHIFT}$.

Subsequently, the burst controller 9 thus set to the phase shift mode $\phi_{SHIFT}$ is further set to any one of the 90-degree phase shift mode, the 60-degree phase shift mode, and the 45-degree phase shift mode, based upon the voltage levels $V_{BS1}$ through $V_{BS8}$ of the respective channel burst dimming terminals BS.

The comparators COMP1 through COMP8 are provided to the respective channels, and are configured to compare the respective channel voltages $V_{BS1}$ through $V_{BS8}$ with a predetermined threshold voltage Vth2. The threshold voltage Vth2 is preferably set to be on the order of 0.1 V, for example. The i-th channel comparator COMPi outputs an detection signal Si which is set to high level (H) when $V_{BSi}$ is lower than Vth2, and which is set to low level (L) when $V_{BSi}$ is higher than Vth2.

When the LED string 6_i is connected to the i-th burst dimming terminal BSi, if the driving current $I_{LEDi}$ is zero, the voltage level $V_{BSi}$ rises up to the vicinity of the output voltage Vout. On the other hand, when the LED string 6_i is not connected to the burst dimming terminal BSi, the voltage level $V_{BSi}$ at the burst diming terminal BSi drops to the vicinity of the ground voltage. That is to say, the output signal Si of the comparator COMPi indicates whether or not the LED string 6_i is connected to the i-th burst dimming terminal BSi.

In the judgment period $T_{JDG}$, when all the electric potentials $V_{BS5}$ through $V_{BS8}$ at the respective burst dimming terminals BS5 through BS8 of the fifth channel through the eighth channel are lower than the predetermined threshold voltage Vth2, i.e., when the conditional expression S5=H && S6=H && S7=H && S8=H is satisfied (YES in S104), the burst controller 9 is set to the 90-degree shift mode $\phi_{90}$ (S106). This represents a state in which the LED strings 6_5 through 6_8 are not connected to the respective fifth through eighth channels. Here, "(A=B)" is an operator which indicates true (1) when A is equal to B, and false (0) when A is not equal to B. The symbol "&&" is an operator which represents the logical AND.

When the aforementioned conditional expression is not satisfied (NO in S104), the flow proceeds to Step S108. When the electric potentials $V_{BS7}$ and $V_{BS8}$ at the respective burst dimming terminals BS7 and BS8 of the seventh and eighth channels are each lower than the second threshold voltage Vth2, i.e., when the conditional expression S7=H && S8=H is satisfied (YES in S108), the first through sixth channels are set as the driving targets. Thus, the mode is set to the 60-degree phase shift mode $\phi_{60}$ (S110).

In other cases (NO in S108), all the channels are set as the driving targets. Thus, the mode is set to the 45-degree phase shift mode $\phi_{45}$ (S112).

As described above, judgment of whether or not an LED string 6 has been connected is made for each individual channel. During the driving period, an error amplifier EA1 amplifies the difference between a reference voltage Vref (e.g., 0.3 V) and the lowest of the voltages $V_{BS}$ at the respective channels to which the respective LED strings 6 have been connected, so as to generate an error voltage Verr that corresponds to the difference thus generated. The error voltage Verr is output from an FB terminal via a transistor Q2 and a resistor R6, and is input to a feedback terminal of the control IC 100. During the driving period, the control IC 100 adjusts the output voltage Vout such that the reference voltage Vref matches the lowest of the voltages $V_{BS}$ at the channels to which LED strings 6 have been connected.

The above is the configuration of the light emitting apparatus 3. Next, description will be made regarding the operation thereof.

Description will be made directing attention to the channel at which the output transistor Q1 has the lowest base voltage $V_{BS}$.

The base voltage $V_{BS}$ of the output transistor Q1 is subjected to feedback control by means of the switching power supply 4 such that the base voltage $V_{BS}$ matches the reference voltage Vref. Furthermore, the voltage drop $V_{R4}$ at the current control resistor R4 is subjected to feedback control by means of the current source CS such that it matches the reference voltage Vref. With the base-emitter voltage of the output transistor Q1 as Vf, with the collector-emitter voltage as $V_{CE}$, and with the voltage drop that occurs at the heat dissipation resistor R7 as $V_{R7}$, the following expression holds true with respect to the emitter voltage of the output transistor Q1.

$$V\text{ref} + Vf = V\text{ref} + V_{R7} + V_{CE} \quad (1)$$

By transformation of the aforementioned Expression (1), the following Expression (2) is obtained.

$$V_{CE} = Vf - V_{R7} \quad (2)$$

As can be understood from Expression (2), the collector-emitter voltage $V_{CE}$, of the output transistor Q1 is reduced by the voltage drop $V_{R7}$ that occurs at the heat dissipation resistor R7, as compared with an arrangement that does not include the heat dissipation resistor R7. This means that such an arrangement is capable of reducing power consumption of the output transistor Q1, i.e., is capable of reducing its heat generation.

Such an advantage of reduced heat generation of the output transistor Q1 facilitates the design of the heat generation countermeasures for the electronic device 2 mounting the light emitting apparatus 3, thereby reducing the costs required for the heat generation countermeasures.

In order to provide sufficient heat dissipation effects, the resistance value of the heat dissipation resistor R7 is preferably designed such that the voltage drop $V_{R7}$ that occurs at the heat dissipation resistor R7 becomes on the order of 20% of the base-emitter voltage Vf of the output transistor Q1, or becomes equal to or greater than 20% of the base-emitter voltage Vf of the output transistor Q1.

$$0.2 \times Vf < V_{R7} < Vf \quad (3)$$

The voltage drop $V_{R7}$ that occurs at the heat dissipation resistor R7 is represented by Expression (4).

$$V_{R7} = I_{LED} \times R7 \quad (4)$$

Thus, by designing the resistance value of the heat dissipation resistor R7 to be included in the following range, such an arrangement is capable of appropriately reducing the heat generation of the output transistor Q1.

$$0.2 \times Vf/I_{LED} < R7 < Vf/I_{LED}$$

Description has been made regarding the present invention with reference to the embodiments. The above-described embodiments have been described for exemplary purposes only, and are by no means intended to be interpreted restrictively. Rather, various modifications may be made by making various combinations of the aforementioned components or processes, which are also encompassed in the technical scope of the present invention. Description will be made below regarding such modifications.

Description has been made in the embodiment regarding a non-insulated switching power supply employing an inductor. Also, the present invention can be applied to an insulated switching power supply employing a transformer.

Description has been made in the embodiment regarding an electronic device as an application of the light emitting apparatus 3. However, the usage thereof is not restricted in particular. Also, the light emitting apparatus 3 can be applied to an illumination device.

The settings of the logical signals, such as the high-level state and the low-level state of the logical signals, have been described in the present embodiment for exemplary purposes only. The settings can be freely modified by inverting the signals using inverters or the like.

While the preferred embodiments of the present invention have been described using specific terms, such description is for illustrative purposes only, and it is to be understood that changes and variations may be made without departing from the spirit or scope of the appended claims.

What is claimed is:

1. A phase shift controller configured to receive a pulse-width modulated dimming pulse signal, and to generate n (n is an integer of 2 or more) burst control signals which are used to drive n channels of light emitting diode strings, each of which has the same period as that of the dimming pulse signal, and which have respective phases that differ from one another by 1/n the period of the dimming pulse signal, the phase shift controller comprising:
    a positive edge counter configured to start counting, starting with an initial value, upon receiving a positive edge of the dimming pulse signal;
    a negative edge counter configured to start counting, starting with an initial value, upon receiving a negative edge of the dimming pulse signal;
    a latch configured to receive a count value from at least one from among the positive edge counter and the negative edge counter, and to latch a period count value that corresponds to the period of the dimming pulse signal; and
    channel control units arranged for the respective second through n-th channels,
    wherein the channel control unit of the i-th ($2 \leq i \leq n$) channel is configured to perform: (A) an operation in which the phase shift amount of the corresponding channel is calculated by multiplying the period count value by (i−1)/n; (B) an operation in which, when the count value of the positive edge counter matches the phase shift amount of the corresponding channel, the burst control signal of the corresponding channel is switched to a first level; and (C) an operation in which, when the count value of the negative edge counter matches the phase shift amount of the corresponding channel, the burst control signal of the corresponding channel is switched to a second level.

2. A phase shift controller according to claim 1, wherein the channel control unit of the i-th channel performs (D) an operation in which, when the burst control signal of the corresponding channel has not transited to the second level before a negative edge occurs in the dimming pulse signal, the corresponding burst control signal is switched to the second level at a timing at which the negative edge occurs in the dimming pulse signal.

3. A phase shift controller according to claim 2, wherein the channel control unit of the i-th channel comprises:
    a shift amount calculation unit configured to calculate the phase shift amount of the channel by multiplying the period count value by (i−1)/n;
    a set circuit configured to generate a set signal which is asserted when the count value of the positive edge counter matches the phase shift amount of the corresponding channel;

a first reset circuit configured to generate a first reset signal which is asserted when the count value of the negative edge counter matches the phase shift amount of the corresponding channel;

a second reset circuit configured to generate a second reset signal which is asserted at a timing at which a negative edge timing occurs in the dimming pulse signal when the burst control signal of the corresponding channel has not transited to the second level before the negative edge occurs in the dimming pulse signal; and a flip-flop configured to switch the burst control signal of the corresponding channel to the first level when the set signal of the corresponding channel is asserted, and to switch the burst control signal of the corresponding channel to the second level when either the first reset signal or the second reset signal is asserted with respect to the corresponding channel.

4. A phase shift controller according to claim 1, wherein the channel control unit of the i-th channel comprises:

a shift amount calculation unit configured to calculate the phase shift amount of the corresponding channel by multiplying the period count value by (i−1)/n;

a set circuit configured to generate a set signal which is asserted when the count value of the positive edge counter matches the phase shift amount of the corresponding channel;

a first reset circuit configured to generate a first reset signal which is asserted when the count value of the negative edge counter matches the phase shift amount of the corresponding channel;

an SR flip-flop configured to switch the burst control signal for the corresponding channel to the first level when the set signal of the corresponding channel is asserted, and to switch the burst control signal for the corresponding channel to the second level when the first reset signal of the corresponding channel is asserted.

5. A phase shift controller according to claim 3, wherein the second reset circuit comprises:

a first flip-flop configured to receive the dimming pulse signal;

a second flip-flop configured to output an output signal of the first flip-flop;

a third flip-flop configured to receive the burst control signal of a corresponding channel;

a fourth flip-flop configured to receive an output signal of the third flip-flop;

a first AND gate configured to generate the logical AND of an inverted output signal of the first flip-flop and an output signal of the second flip-flop;

a second AND gate configured to generate the logical AND of the inverted output signal of the third flip-flop and an output signal of the fourth flip-flop;

a second SR flip-flop configured to be set according to the output of the first AND gate, and to be reset according to the output of the second AND gate; and a third AND gate configured to generate, as the second reset signal, the logical AND of the output of the first AND gate and the output of the second SR flip-flop.

6. A light emitting apparatus comprising:
a plurality of light emitting diode strings;
a switching power supply configured to supply a driving voltage to the plurality of light emitting diode strings;
a phase shift controller configured to receive a pulse width modulated dimming pulse signal, and to generate a burst control signal for each of the plurality of light emitting diode strings; and a plurality of current sources respectively arranged for the light emitting diode strings, and each configured to supply a driving current to a corresponding light emitting diode string when the corresponding burst control signal indicates the on period, wherein the phase shift controller is configured to receive a pulse-width modulated dimming pulse signal, and to generate n (n is an integer of 2 or more) burst control signals which are used to drive n channels of light emitting diode strings, each of which has the same period as that of the dimming pulse signal, and which have respective phases that differ from one another by 1/n the period of the dimming pulse signal, the phase shift controller comprises:

a positive edge counter configured to start counting, starting with an initial value, upon receiving a positive edge of the dimming pulse signal;

a negative edge counter configured to start counting, starting with an initial value, upon receiving a negative edge of the dimming pulse signal;

a latch configured to receive a count value from at least one from among the positive edge counter and the negative edge counter, and to latch a period count value that corresponds to the period of the dimming pulse signal; and channel control units arranged for the respective second through n-th channels, wherein the channel control unit of the i-th ($2 \leq i \leq n$) channel is configured to perform: (A) an operation in which the phase shift amount of the corresponding channel is calculated by multiplying the period count value by (i−1)/n; (B) an operation in which, when the count value of the positive edge counter matches the phase shift amount of the corresponding channel, the burst control signal of the corresponding channel is switched to a first level; and (C) an operation in which, when the count value of the negative edge counter matches the phase shift amount of the corresponding channel, the burst control signal of the corresponding channel is switched to a second level.

7. An electronic device comprising:
a liquid crystal panel; and
a light emitting apparatus arranged as a backlight of the liquid crystal panel, wherein
the light emitting apparatus comprises:
a plurality of light emitting diode strings;
a switching power supply configured to supply a driving voltage to the plurality of light emitting diode strings;
a phase shift controller configured to receive a pulse width modulated dimming pulse signal, and to generate a burst control signal for each of the plurality of light emitting diode strings; and
a plurality of current sources respectively arranged for the light emitting diode strings, and each configured to supply a driving current to a corresponding light emitting diode string when the corresponding burst control signal indicates the on period, wherein
the phase shift controller is configured to receive a pulse-width modulated dimming pulse signal, and to generate n (n is an integer of 2 or more) burst control signals which are used to drive n channels of light emitting diode strings, each of which has the same period as that of the dimming pulse signal, and which have respective phases that differ from one another by 1/n the period of the dimming pulse signal, the phase shift controller comprises:

a positive edge counter configured to start counting, starting with an initial value, upon receiving a positive edge of the dimming pulse signal;

a negative edge counter configured to start counting, starting with an initial value, upon receiving a negative edge of the dimming pulse signal;

a latch configured to receive a count value from at least one from among the positive edge counter and the negative edge counter, and to latch a period count value that corresponds to the period of the dimming pulse signal; and channel control units arranged for the respective second through n-th channels, wherein the channel control unit of the i-th ($2 \leq i \leq n$) channel is configured to perform: (A) an operation in which the phase shift amount of the corresponding channel is calculated by multiplying the period count value by $(i-1)/n$; (B) an operation in which, when the count value of the positive edge counter matches the phase shift amount of the corresponding channel, the burst control signal of the corresponding channel is switched to a first level; and (C) an operation in which, when the count value of the negative edge counter matches the phase shift amount of the corresponding channel, the burst control signal of the corresponding channel is switched to a second level.

8. A method for generating, according to a pulse width modulated dimming pulse signal, n (n is an integer of 2 or more) burst control signals which are used to drive n channels of light emitting diode strings, each of which has the same period as that of the dimming pulse signal, and which have respective phases that differ from one another by 1/n the period of the dimming pulse signal, the method comprising:

starting counting by a positive edge counter, starting with an initial value, upon receiving a positive edge of the dimming pulse signal;

starting counting by a negative edge counter, starting with an initial value, upon receiving a negative edge of the dimming pulse signal;

latching a period count value that corresponds to the period of the dimming pulse signal based on the count value of at least one from among the positive edge counter and the negative edge counter;

for each i-th ($2 \leq i \leq n$) channel, calculating a phase shift amount by multiplying the period count value by $(i-1)/n$;

for each i-th channel, performing an operation in which, when the count value of the positive edge counter matches the phase shift amount of the corresponding channel, the burst control signal for the corresponding channel is switched to a first level; and for each i-th channel, performing an operation in which, when the count value of the negative edge counter matches the phase shift amount of the corresponding channel, the burst control signal for the corresponding channel is switched to a second level.

9. A method according to claim 8, wherein an operation in which, when the burst control signal of the corresponding channel has not transited to the second level before a negative edge occurs in the dimming pulse signal, the corresponding burst control signal is switched to the second level at a timing at which the negative edge occurs in the dimming pulse signal.

* * * * *